(12) United States Patent
Petrzilek

(10) Patent No.: US 9,165,718 B2
(45) Date of Patent: Oct. 20, 2015

(54) WET ELECTROLYTIC CAPACITOR CONTAINING A HYDROGEN PROTECTION LAYER

(71) Applicant: AVX Corporation, Fountain Inn, SC (US)

(72) Inventor: Jan Petrzilek, Usti nad Orlici (CZ)

(73) Assignee: AVX Corporation, Fountain Inn, SC (US)

( * ) Notice: Subject to any disclaimer, the term of this patent is extended or adjusted under 35 U.S.C. 154(b) by 184 days.

(21) Appl. No.: 14/027,307

(22) Filed: Sep. 16, 2013

(65) Prior Publication Data

US 2015/0077900 A1    Mar. 19, 2015

(51) Int. Cl.
  *H01G 9/08*   (2006.01)
  *H01G 9/10*   (2006.01)
  *H01G 9/00*   (2006.01)

(52) U.S. Cl.
  CPC ............... *H01G 9/10* (2013.01); *H01G 9/0029* (2013.01)

(58) Field of Classification Search
  USPC ......... 361/517, 503–504, 508–509, 516, 518, 361/519, 523–525, 528–529
  See application file for complete search history.

(56) References Cited

U.S. PATENT DOCUMENTS

| | | |
|---|---|---|
| 3,628,103 A | 12/1971 | Booe |
| 4,017,302 A | 4/1977 | Bates et al. |
| 4,441,927 A | 4/1984 | Getz et al. |
| 4,483,819 A | 11/1984 | Albrecht et al. |
| 4,523,255 A | 6/1985 | Rogers |
| 4,555,268 A | 11/1985 | Getz |
| 4,683,516 A | 7/1987 | Miller |
| 4,780,797 A | 10/1988 | Libby |
| 4,864,472 A | 9/1989 | Yoshimura |
| 4,942,500 A | 7/1990 | Libby et al. |
| 4,943,892 A | 7/1990 | Tsuchiya et al. |
| 4,960,471 A | 10/1990 | Fife et al. |
| 5,019,949 A | 5/1991 | Ikeda et al. |
| 5,043,849 A | 8/1991 | Libby |
| 5,071,521 A | 12/1991 | Kojima et al. |
| 5,082,491 A | 1/1992 | Rerat |
| 5,111,327 A | 5/1992 | Blohm et al. |
| 5,117,332 A | 5/1992 | Kudoh et al. |
| 5,119,274 A | 6/1992 | Kinuta et al. |
| 5,187,649 A | 2/1993 | Kudoh et al. |
| 5,187,650 A | 2/1993 | Kudoh et al. |
| 5,232,169 A | 8/1993 | Kaneko et al. |
| 5,369,547 A | 11/1994 | Evans |

(Continued)

OTHER PUBLICATIONS

Abstract of Japanese Patent—JP2011225690, Nov. 10, 2011, 1 page.

(Continued)

*Primary Examiner* — Nguyen T Ha
(74) *Attorney, Agent, or Firm* — Dority & Manning, P.A.

(57) ABSTRACT

A wet electrolytic capacitor that contains a casing within which is positioned an anode formed from an anodically oxidized sintered porous body and a fluidic working electrolyte is provided. The casing contains a metal substrate over which is disposed a hydrogen protection layer that contains a plurality of sintered agglomerates formed from a valve metal composition. The present inventors have discovered that through careful selection of the relative particle size and distribution of the agglomerates, the resulting protection layer can effectively absorb and dissipate hydrogen radicals generated during use and/or production of the capacitor, which could otherwise lead to embrittlement and cracking of the metal substrate.

19 Claims, 3 Drawing Sheets

(56) References Cited

U.S. PATENT DOCUMENTS

| | | |
|---|---|---|
| 5,424,907 A | 6/1995 | Kojima et al. |
| 5,457,862 A | 10/1995 | Sakata et al. |
| 5,473,503 A | 12/1995 | Sakata et al. |
| 5,522,558 A | 6/1996 | Kaneko |
| 5,726,118 A | 3/1998 | Ivey et al. |
| 5,729,428 A | 3/1998 | Sakata et al. |
| 5,812,367 A | 9/1998 | Kudoh et al. |
| 5,858,911 A | 1/1999 | Wellen et al. |
| 5,954,856 A | 9/1999 | Pathare et al. |
| 6,088,218 A | 7/2000 | Hamada et al. |
| 6,126,097 A | 10/2000 | Chen et al. |
| 6,134,099 A | 10/2000 | Igaki et al. |
| 6,145,765 A | 11/2000 | Capelle, Jr. et al. |
| 6,168,639 B1 | 1/2001 | Taketani et al. |
| 6,197,252 B1 | 3/2001 | Bishop et al. |
| 6,224,639 B1 | 5/2001 | Hamada et al. |
| 6,238,456 B1 | 5/2001 | Wolf et al. |
| 6,239,965 B1 | 5/2001 | Shiraishi et al. |
| 6,313,979 B1 | 11/2001 | Taketani et al. |
| 6,324,050 B1 | 11/2001 | Kabatake et al. |
| 6,361,572 B1 | 3/2002 | Igaki et al. |
| 6,409,777 B2 | 6/2002 | Kobatake et al. |
| 6,426,866 B2 | 7/2002 | Shoji et al. |
| 6,462,936 B1 | 10/2002 | Fujimoto et al. |
| 6,576,038 B1 | 6/2003 | Rao |
| 6,594,140 B1 | 7/2003 | Evans et al. |
| 6,614,063 B2 | 9/2003 | Hayashi et al. |
| 6,635,729 B1 | 10/2003 | Groenendaal et al. |
| 6,671,168 B2 | 12/2003 | Yoshida et al. |
| 6,687,116 B2 | 2/2004 | Hudis |
| 6,733,545 B2 | 5/2004 | Shoji et al. |
| 6,791,821 B1 | 9/2004 | Monnett |
| 6,853,540 B2 | 2/2005 | Kudoh et al. |
| 6,885,547 B2 | 4/2005 | Nitta et al. |
| 6,987,663 B2 | 1/2006 | Merker et al. |
| 7,125,764 B2 | 10/2006 | Taketani et al. |
| 7,157,326 B2 | 1/2007 | Suda |
| 7,180,728 B2 | 2/2007 | Kobayashi |
| 7,248,461 B2 | 7/2007 | Takagi et al. |
| 7,262,954 B1 | 8/2007 | Iida et al. |
| 7,374,585 B2 | 5/2008 | Yoshimitsu et al. |
| 7,479,166 B2 | 1/2009 | Ito |
| 7,515,396 B2 | 4/2009 | Biler |
| 7,729,103 B2 | 6/2010 | Kato et al. |
| 7,742,281 B2 | 6/2010 | Goto et al. |
| 7,760,490 B2 | 7/2010 | Takatani et al. |
| 7,800,887 B2 | 9/2010 | Iida et al. |
| 7,821,772 B2 | 10/2010 | Kobayashi et al. |
| 7,842,104 B2 | 11/2010 | Yoshimitsu |
| 7,862,852 B2 | 1/2011 | Lee |
| 7,876,549 B2 | 1/2011 | Umemoto et al. |
| 8,027,151 B2 | 9/2011 | Kikuchi et al. |
| 8,035,953 B2 | 10/2011 | Nemoto et al. |
| 8,050,014 B2 | 11/2011 | Iwasa et al. |
| 8,057,553 B2 | 11/2011 | Iwasa et al. |
| 8,083,920 B2 | 12/2011 | Yoshimitsu |
| 8,116,068 B2 | 2/2012 | Nishimura |
| 8,206,467 B2 | 6/2012 | Hayashi et al. |
| 8,213,158 B2 | 7/2012 | Takatani et al. |
| 8,218,290 B2 | 7/2012 | Ota et al. |
| 8,228,664 B2 | 7/2012 | Yamaguchi et al. |
| 8,273,135 B2 | 9/2012 | Furukawa et al. |
| 8,279,585 B2 | 10/2012 | Dreissig et al. |
| 8,363,385 B2 | 1/2013 | Yoshimitsu |
| 8,405,958 B2 | 3/2013 | Takahashi et al. |
| 8,422,201 B2 | 4/2013 | Harada et al. |
| 8,425,805 B2 | 4/2013 | Harada et al. |
| 8,441,776 B2 | 5/2013 | Komatsu et al. |
| 8,470,389 B2 | 6/2013 | Furukawa et al. |
| 8,503,167 B2 | 8/2013 | Ota et al. |
| 8,514,547 B2 | 8/2013 | Galvagni et al. |
| 8,568,616 B2 | 10/2013 | Hsu et al. |
| 8,605,411 B2 | 12/2013 | Biler et al. |
| 2009/0231782 A1 | 9/2009 | Fujita et al. |
| 2009/0237863 A1 | 9/2009 | Breithaupt et al. |
| 2010/0085685 A1* | 4/2010 | Pinwill ................... 361/523 |
| 2010/0157510 A1 | 6/2010 | Miyachi et al. |
| 2010/0172068 A1 | 7/2010 | Yoshimitsu |
| 2010/0182736 A1 | 7/2010 | Miyachi et al. |
| 2010/0193745 A1 | 8/2010 | Harada et al. |
| 2010/0271757 A1 | 10/2010 | Ishikawa et al. |
| 2010/0302714 A1 | 12/2010 | Kobayakawa et al. |
| 2011/0051319 A1 | 3/2011 | Ishikawa et al. |
| 2011/0122546 A1 | 5/2011 | Nobuta et al. |
| 2011/0211295 A1 | 9/2011 | Ueda et al. |
| 2011/0233450 A1 | 9/2011 | Nobuta et al. |
| 2012/0069491 A1 | 3/2012 | Biler |
| 2013/0155580 A1* | 6/2013 | Karnik et al. ................. 361/508 |
| 2013/0242465 A1 | 9/2013 | Weaver et al. |
| 2013/0242466 A1* | 9/2013 | Masheder et al. ............. 361/504 |
| 2013/0242467 A1* | 9/2013 | Biler ............................ 361/504 |
| 2013/0242468 A1 | 9/2013 | Pinwill et al. |

OTHER PUBLICATIONS

Abstract of Article—Choi et al., "Poly(3,4-ethylenedioxythiophene) nanoparticles prepared in aqueous DBSA solutions," *Snythetic Metals*, vol. 141, Issue 3, 2004, pp. 293-299.

Abstract of Presentation—Midler, "Microemulsions as drug delivery systems," Mar. 3, 2003, 2 pages, http://www.vetcontact.com/.

Abstract of Presentation—Winkels et al., "Electropolymerization of Thiophene Derivatives and Composite Materials from Microemulsions," 2001 Joint International Meeting—the 200th Meeting of The Electrochemical Society, Inc. and the 52nd Annual Meeting of the International Society of Electrochemistry—San Francisco, California, 2001, 1 page.

Article—Edson et al., "Electrical Properties of a Novel High CV Wet Tantalum Capacitor System," *CARTS USA 2009*, Jacksonville, Florida, Mar. 30-Apr. 2, 2009, 11 pages.

Article—Harrison, "Microemulsion technology for surfactants," *Speciality Chemicals Magazine*, Nov. 2004, pp. 32-36, www.specchemonline.com.

Article—Naoi et al., "Simultaneous electrochemical formulation of $Al_2O_3$/polypyrrole layers (I): effect of electrolyte anion in formation process," *Electrochimica Acta*, vol. 45, Issue 20, 2000, pp. 3413-3421.

Article—Naoi et al., "Simultaneous Formation of Separate Conducting and Insulating Layers on Aluminum Electrode by Electrolysis," *Electrochemical and Solid-State Letters*, vol. 1, Issue 1, 1998, pp. 34-36.

Article—Tsakova et al., "Anodic polymerization of 3,4-ethylenedioxythiophene from aqueous microemulsions," *Electrochimica Acta*, vol. 46, Issue 5, 2000, pp. 759-768.

Article—Wang et al., "Electrochemical supercapacitor electrode material based on poly(3,4-ethylenedioxythiophene)/polypyrrole composite," *Journal of Power Sources*, vol. 163, Issue 2, 2007, pp. 1120-1125.

Article—Wang, "Research progress on a novel conductive polymer—poly(3,4-ethylenedioxythiophene) (PEDOT)," *Journal of Physics: Conference Series*, vol. 152, Issue 1, 2009, pp. 012023.

Book—Behler et al., *Reactions and Synthesis in Surfactant Systems*, Chapter 1: Industrial Surfactant Syntheses, 2001, 44 pages.

Related Application Form.

* cited by examiner

WET ELECTROLYTIC CAPACITOR CONTAINING A HYDROGEN PROTECTION LAYER

BACKGROUND OF THE INVENTION

Electrolytic capacitors typically have a larger capacitance per unit volume than certain other types of capacitors, making them valuable in relatively high-current and low-frequency electrical circuits. One type of capacitor that has been developed is a "wet" electrolytic capacitor that includes a sintered tantalum powder anode. These tantalum slugs first undergo an electrochemical oxidation that forms an oxide layer coating acting as dielectric over the entire external and internal surfaces of the tantalum body. The anodized tantalum slugs may then be sealed within a metal casing (e.g., tantalum) containing a liquid electrolyte solution. One problem with wet electrolytic capacitors, however, is that the casing is susceptible to cracking, which can lead to leakage of the electrolyte and a rapid deterioration of electrical performance. A common reason for cracking is hydrogen embrittlement, which can result when the casing absorbs a certain degree of hydrogen radicals produced by the electrolyte. As such, a need still exists for an improved wet electrolytic capacitor that has a reduced susceptibility to hydrogen embrittlement.

SUMMARY OF THE INVENTION

In accordance with one embodiment of the present invention, a wet electrolytic capacitor is disclosed that comprises a casing within which is positioned an anode formed from an anodically oxidized sintered porous body and a fluidic working electrolyte. The casing contains a metal substrate over which is disposed a hydrogen protection layer. The protection layer contains a plurality of sintered valve metal agglomerates formed from a valve metal composition, wherein the agglomerates have an aggregate D50 size of about 100 micrometers or less and wherein no more than about 5% of the agglomerates having a size greater than 150 micrometers.

Other features and aspects of the present invention are described in more detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
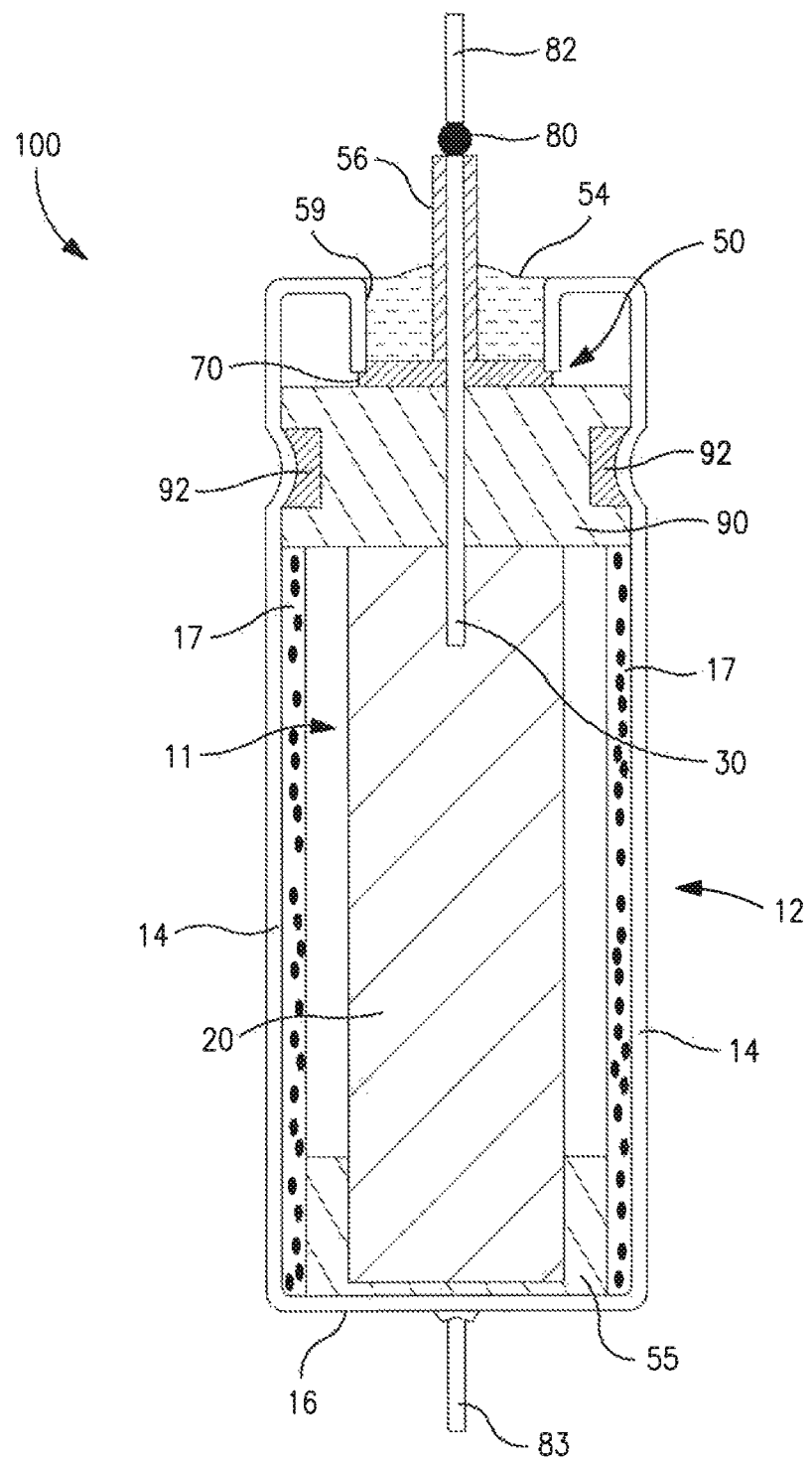
FIG. 1 is a schematic view of one embodiment of the wet electrolytic capacitor of the present invention 1.

Repeat use of reference characters in the present specification and drawing is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a wet electrolytic capacitor that contains a casing within which is positioned an anode formed from an anodically oxidized sintered porous body and a fluidic working electrolyte. The casing contains a metal substrate over which is disposed a hydrogen protection layer that contains a plurality of sintered agglomerates formed from a valve metal composition. The present inventors have discovered that through careful selection of the relative particle size and distribution of the agglomerates, the resulting protection layer can effectively absorb and dissipate hydrogen radicals generated during use and/or production of the capacitor, which could otherwise lead to embrittlement and cracking of the metal substrate. The agglomerates may, for example, have an aggregate D50 size of about 100 micrometers or less, in some embodiments from about 1 to about 80 micrometers, and in some embodiments, from about 10 to about 70 micrometers, wherein the term "D50 size" generally means that at least 50% of the agglomerates having a size within the denoted range as determined by sieve analysis. The particle size distribution of the agglomerates may also be relatively narrow. For example, no more than about 5%, in some embodiments no more than about 2%, and in some embodiments, no more than about 1% of the agglomerates having a size greater than 150 micrometers.

In addition to having a small aggregate size within a controlled range, the primary particle size of the agglomerates may also be relatively small. For example, the average primary particle size of the agglomerates may be from about 5 nanometers to about 20 micrometers, in some embodiments from about 10 nanometers to about 10 micrometers, in some embodiments from about 15 nanometers to about 5 micrometers, and in some embodiments, from about 20 nanometers to about 800 nanometers. The agglomerates may likewise have a relatively high specific surface area, such as about 1.2 m$^2$/g or more, in some embodiments about 1.5 m$^2$/g or more, and in some embodiments, from about 2.0 to about 8.0 m$^2$/g. The "specific surface area" may be determined using a variety of techniques known in the art, such as by the physical gas adsorption (B.E.T.) method of Bruanauer, Emmet, and Teller, Journal of American Chemical Society, Vol. 60, 1938, p. 309, with nitrogen as the adsorption gas.

Various embodiments of the present invention will now be described in further detail.

I. Casing

A. Metal Substrate

The metal substrate may serve as a cathode for the capacitor and may be formed from a variety of different metals, such as tantalum, niobium, aluminum, nickel, hafnium, titanium, copper, silver, steel (e.g., stainless), alloys thereof, composites thereof (e.g., metal coated with electrically conductive oxide), and so forth. Tantalum is particularly suitable for use in the present invention. The geometric configuration of the substrate may generally vary as is well known to those skilled in the art, such as in the form of a foil, sheet, screen, container, can, etc. The metal substrate may form the all or a portion of casing for the capacitor, or it may simply be applied to the casing. Regardless, the substrate may have a variety of shapes, such as generally cylindrical, D-shaped, rectangular, triangular, prismatic, etc. If desired, a surface of the substrate may be roughened to increase its surface area and increase the degree to which a material may be able to adhere thereto. In one embodiment, for example, a surface of the substrate is chemically etched, such as by applying a solution of a corrosive substance (e.g., hydrochloric acid) to the surface. Mechanical roughening may also be employed. For instance, a surface of the substrate may be abrasive blasted by propelling a stream of abrasive media (e.g., sand) against at least a portion of a surface thereof.

If desired, a dielectric layer may be formed on the metal substrate prior to application of the hydrogen protection layer. The thickness of the dielectric layer may be controlled within a certain range, such as from about 10 nanometers to about 500 nanometers, in some embodiments from about 15 nanometers to about 200 nanometers, in some embodiments from about 20 nanometers to about 100 nanometers, and some embodiments, from about 30 nanometers to about 80 nanometers. Within intending to be limited by theory, it is believed that acids often present in the working electrolyte can undergo secondary reactions with the metal substrate (e.g., tantalum) at relatively high temperatures. The presence of a relatively thick dielectric layer can therefore help to passivate the metal substrate, and thereby minimize the likelihood that the working electrolyte will react with the substrate to reduce its conductivity and Increase ESR. By ensuring that the thickness is controlled within the ranges noted above, however, the conductivity of the casing is not reduced to such an extent that the electrical properties of the capacitor are adversely impacted.

A surface of the metal substrate (e.g., Interior surface) may be subjected to a voltage to initiate anodic formation ("anodization") of an oxide film (dielectric layer) as described above. For example, a tantalum (Ta) substrate may be anodized to form a dielectric layer of tantalum pentoxide ($Ta_2O_5$). Anodization may be performed by initially applying an electrolyte to the metal substrate, such as by dipping the substrate into a bath that contains the electrolyte, and then applying a current. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethyformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the charge (current multiplied by time) and thereby the thickness of the dielectric layer. For example, the power supply may be initially set up at a galvanostatic mode until the required voltage is reached. Thereafter, the power supply may be switched to a potentiostatic mode in which the voltage is held constant to ensure that the desired dielectric thickness is formed over the surface of the metal substrate. Of course, other known methods may also be employed, such as pulse methods. Regardless, to help achieve the desired thickness for the dielectric layer as noted above, the forming voltage used during anodization, which is typically equal to the peak voltage, is typically high, such as about 5 volts or more, in some embodiments about 7 volts or more, in some embodiments from about 10 volts to about 25 volts, and in some embodiments, from about 12 to about 22 volts. The voltage level may vary (e.g., increasing) or remain constant within this range. The temperature of the anodizing solution may range from about 10° C. to about 200° C., in some embodiments from about 20° C. to about 150° C., and in some embodiments, from about 30° C. to about 100° C. The resulting dielectric layer may thus be formed on the surface of the metal substrate as described above.

B. Hydrogen Protection Layer

As noted above, the casing also contains a hydrogen protection layer, which includes a plurality of relatively small, high surface area agglomerates. The agglomerates are sintered together so that they form a more integral and robust coating. Although not necessarily required, the agglomerates may also be sintered to the metal substrate so that the protection layer remains more readily adhered thereto. The shape of the agglomerates may vary, such as spherical, nodular, flake, etc. Typically, the agglomerates are selected to have a high specific charge to help increase the cathode capacitance, such as about 70,000 microFarads*Volts per gram ("µF*V/g") or more, in some embodiments about 80,000 µF*V/g or more, in some embodiments about 90,000 µF*V/g or more, in some embodiments about 100,000 µF*V/g or more, and in some embodiments, about 120,000 to about 350,000 µF*V/g. Examples of valve metal compositions for forming such agglomerates include valve metals, such as tantalum, niobium, aluminum, hafnium, titanium, alloys thereof, etc., as well as oxides thereof (e.g., niobium oxide), nitrides thereof, and so forth. In a preferred embodiment, the composition contains tantalum.

The agglomerates may be formed using a variety of techniques. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the highly reactive coarse agglomerates may be passivated by gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare, et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No. 4,017,302 to Bates, et al.

The desired size and/or shape of the agglomerates may be achieved by simply controlling various processing parameters as is known in the art, such as the parameters relating to powder formation (e.g., reduction process) and/or agglomeration (e.g., temperature, atmosphere, etc.). Milling techniques may also be employed to grind a precursor powder to the desired size. Any of a variety of milling techniques may be utilized to achieve the desired particle characteristics. For example, the powder may initially be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting powder to the grinding media may be from about 1:5 to about 1:50. Likewise, the ratio of the volume of the fluid medium to the combined volume of the starting powder may be from about 0.5:1 to about 3:1, in some embodiments from about 0.5:1 to about 2:1, and in some embodiments, from about 0.5:1 to about 1:1. Some examples of mills that may be used in the present invention are described in U.S. Pat. Nos. 5,522,558; 5,232,169; 6,126,097; and 6,145,765. Milling may occur for any predetermined amount of time needed to achieve the target size. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc.

Various other conventional treatments may also be employed in the present invention to improve the properties of the powder. For example, in certain embodiments, the agglomerates may be doped with sinter retardants in the presence of a dopant, such as aqueous acids (e.g., phosphoric acid). The amount of the dopant added depends in part on the surface area of the powder, but is typically present in an amount of no more than about 200 parts per million ("ppm"). The dopant may be added prior to, during, and/or subsequent to any heat treatment step(s). The agglomerates may also be subjected to one or more deoxidation treatments to improve ductility. For example, the agglomerates may be exposed to a getter material (e.g., magnesium), such as described in U.S. Pat. No. 4,960,471. The temperature at which deoxidation occurs may vary, but typically ranges from about 700° C. to about 1600° C., in some embodiments from about 750° C. to about 1200° C., and in some embodiments, from about 800° C. to about 1000° C. The total time of deoxidation treatment(s) may range from about 20 minutes to about 3 hours. Deoxidation also preferably occurs in an inert atmosphere (e.g., argon). Upon completion of the deoxidation treatment(s), the magnesium or other getter material typically vaporizes and forms a precipitate on the cold wall of the furnace. To ensure removal of the getter material, however, the agglomerates may be subjected to one or more acid leaching steps, such as with nitric acid, hydrofluoric acid, etc.

Certain additional components may also be incorporated into the powder. For example, the powder may be optionally mixed with a binder to ensure that the agglomerates adequately adhere to each other when applied to the substrate. Suitable binders may include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax™ from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth.

Any of a variety of techniques may generally be employed to apply the agglomerates to the metal substrate in accordance with the present invention, such as heat treating, thermal sintering, sputtering, screen-printing, dipping, electrophoretic coating, electron beam deposition, spraying, roller pressing, brushing, doctor blade casting, and vacuum deposition. Excess agglomerates may be removed, for instance, by inverting the substrate. Upon application, the agglomerates may optionally be heated to remove any binder/lubricant present. Heating may occur, for instance, at a temperature of from about 40° C. to about 800° C. Once applied, one or more hydrogen protection layers of the agglomerates are typically formed on the substrate surface. The thickness of a protection layer may vary depending on the size and configuration of the metal substrate, anode, etc. Generally speaking, a protection layer may have a thickness of from about 1 to about 1000 micrometers, in some embodiments from about 2 to about 800 micrometers, and in some embodiments, from about 5 to about 500 micrometers. The extent to which the agglomerates cover the metal substrate may also vary. For example, in certain embodiments, the protection layer may be substantially continuous such that they agglomerates cover a substantial portion, if not all of the surface of the substrate. In yet other embodiments, the protection layer may be discontinuous such that the agglomerates are applied in, for example, a spaced-apart fashion over the surface so that they form "island-like" structures.

Regardless of how the protection layer is formed, the agglomerates are sintered so that a bond forms between the particles and optionally the metal substrate. For example, sintering may be conducted at a temperature of from about 800° C. to about 2000° C., in some embodiments from about 1200° C. to about 1800° C., and in some embodiments, from about 1500° C. to about 1700° C., for a time of from about 5 minutes to about 100 minutes, and in some embodiments, from about 10 minutes to about 50 minutes. This may occur in one or more steps. If desired, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

C. Electrochemically Active Material

Although not required, an electrochemically active material may also be disposed over the metal substrate to further increase the effective surface area over which the fluidic electrolyte electrochemically communicates with the substrate. When employed, the electrochemically active material is typically disposed over the protection layer such that the protection layer is positioned between the metal substrate and the electrochemically active material. In alternative embodiments, however, the protection layer may instead be disposed over the electrochemically active material.

The nature of the electrochemically active material may vary. For example, a particulate material may be employed that includes conductive particles, such as those formed from ruthenium, iridium, nickel, rhodium, rhenium, cobalt, tungsten, manganese, niobium, molybdenum, lead, titanium, platinum, palladium, and osmium, as well as combinations of these metals. Non-insulating oxide conductive particles may also be employed. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. No. 5,726,118 to Ivey, et al. and U.S. Pat. No. 5,858,911 to Wellen, et al.

A conductive polymer coating may also be employed as the electrochemically active material. The conductive polymer coating may be formed from one or more layers. The material employed in such layer(s) may vary. In one embodiment, for example, the material includes conductive polymer(s) that are typically π-conjugated and have electrical conductivity after oxidation or reduction. Examples of such ω-conjugated conductive polymers include, for instance, polyheterocycles (e.g., polypyrroles, polythiophenes, polyanilines, etc.), polyacetylenes, poly-p-phenylenes, polyphenolates, and so forth. Substituted polythiophenes are particularly suitable for use as conductive polymer in that they have particularly good mechanical robustness and electrical performance. In one particular embodiment, the substituted polythiophene has the following general structure:

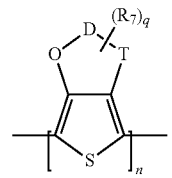

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

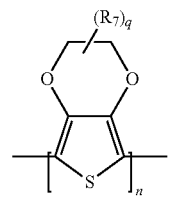

Methods for forming conductive polymers, such as described above, are well known in the art. For instance, U.S. Pat. No. 6,987,663 to Merker, et al. describes various techniques for forming substituted polythiophenes from a monomeric precursor. The monomeric precursor may, for instance, have the following structure:

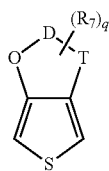

wherein,

T, D, R$_7$, and q are defined above. Particularly suitable thiophene monomers are those in which "D" is an optionally substituted C$_2$ to C$_3$ alkylene radical. For instance, optionally substituted 3,4-alkylenedioxythiophenes may be employed that have the general structure:

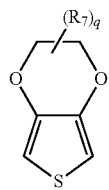

wherein, R$_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium(III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., FeCl$_3$) or iron(III) salts of other inorganic acids, such as Fe(ClO$_4$)$_3$ or Fe$_2$(SO$_4$)$_3$ and the iron(III) salts of organic acids and Inorganic acids comprising organic radicals. Examples of iron (III) salts of inorganic acids with organic radicals include, for instance, iron(III) salts of sulfuric acid monoesters of C$_1$ to C$_{20}$ alkanols (e.g., iron(III) salt of lauryl sulfate). Likewise, examples of iron(III) salts of organic acids include, for instance, iron(III) salts of C$_1$ to C$_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); Iron (III) salts of aliphatic C$_1$ to C$_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by C$_1$ to C$_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ. Suitable application techniques may include screen-printing, dipping, electrophoretic coating, and spraying, may be used to form a conductive polymer coating. As an example, the monomer may initially be mixed with the oxidative catalyst to form a precursor solution. Once the mixture is formed, it may be applied and then allowed to polymerize so that the conductive coating is formed. Alternatively, the oxidative catalyst and monomer may be applied sequentially. In one embodiment, for example, the oxidative catalyst is dissolved in an organic solvent (e.g., butanol) and then applied as a solution. The solution may then be dried to remove the solvent therefrom. Thereafter, the catalyst coating can be contacted with a solution containing the monomer. Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

In addition to in situ application, a conductive polymer layer may also be applied in the form of a dispersion of conductive polymer particles. Although their size may vary, it is typically desired that the particles possess a small diameter to increase the surface area available for adhering to the substrate. For example, the particles may have an average diameter of from about 1 to about 500 nanometers, in some embodiments from about 5 to about 400 nanometers, and in some embodiments, from about 10 to about 300 nanometers. The D$_{90}$ value of the particles (particles having a diameter of less than or equal to the D$_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The total target thickness of the electrochemically active coating may generally vary depending on the desired properties of the capacitor. Typically, the coating has a thickness of from about 0.2 micrometers ("μm") to about 50 μm, in some embodiments from about 0.5 μm to about 20 μm, and in some embodiments, from about 1 μm to about 5 μm. Regardless, the resulting cathode, including the substrate, hydrogen protection layer, and optional electrochemically active material, may have a relatively small thickness. For example, the cathode may have a thickness ranging from about 50 micrometers to about 2000 micrometers, in some embodiments from about 100 micrometers to about 1500 micrometers, and in some embodiments, from about 200 micrometers to about 1000 micrometers.

II. Anode

The anode of the electrolytic capacitor includes a porous body that may be formed from a valve metal composition, such as described above. In one embodiment, for example, the anode is formed from a tantalum powder. The powder may contain agglomerates having any of a variety of shapes, such as nodular, angular, flake, etc., as well as mixtures thereof. In certain cases, the anode may be formed from a powder having a high specific charge. That is, the powder may have a specific charge of about 70,000 microFarads*Volts per gram ("µF*V/g") or more, in some embodiments about 80,000 µF*V/g or more, in some embodiments about 90,000 µF*V/g or more, in some embodiments about 100,000 µF*V/g or more, and in some embodiments, from about 120,000 to about 350,000 µF*V/g. Of course, although powders of a high specific charge are normally desired, it is not necessarily a requirement. In certain embodiments, for example, powders having a specific charge of less than about 70,000 microFarads*Volts per gram ("µF*V/g"), in some embodiments about 2,000 µF*V/g to about 65,000 µF*V/g, and in some embodiments, from about 5,000 to about 50,000 µF*V/g.

Once formed, the resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body. If desired, any binder may be removed after compression, such as by heating the formed pellet under vacuum at a certain temperature (e.g., from about 150° C. to about 500° C.) for several minutes. Alternatively, binder may also be removed by contacting the pellet with an aqueous solution, such as described in U.S. Pat. No. 6,197,252 to Bishop, et al. Regardless, the pressed anode body is sintered to form a porous, integral mass. The sintering conditions may be within the ranges noted above.

Figure 2:
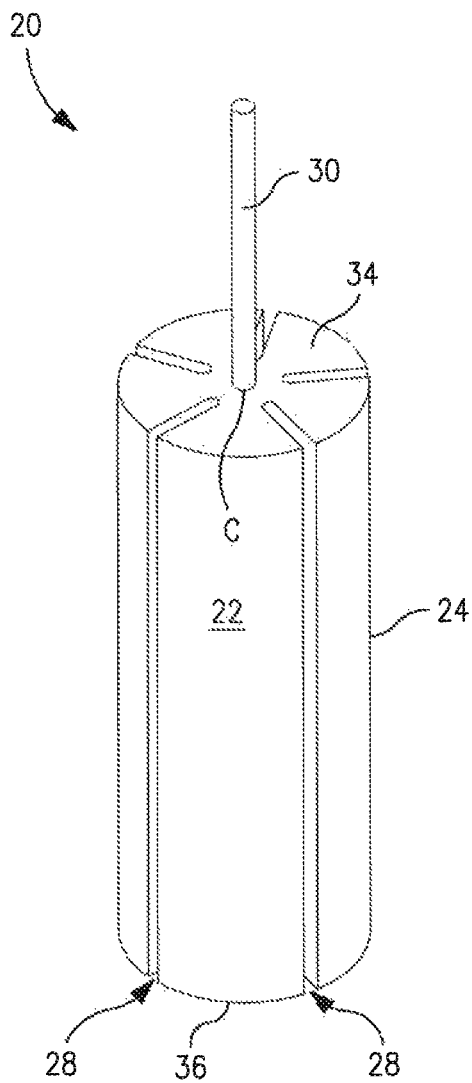
FIG. 2 is a perspective view of one embodiment of an anode that may be employed in the wet electrolytic capacitor.
Figure 3:
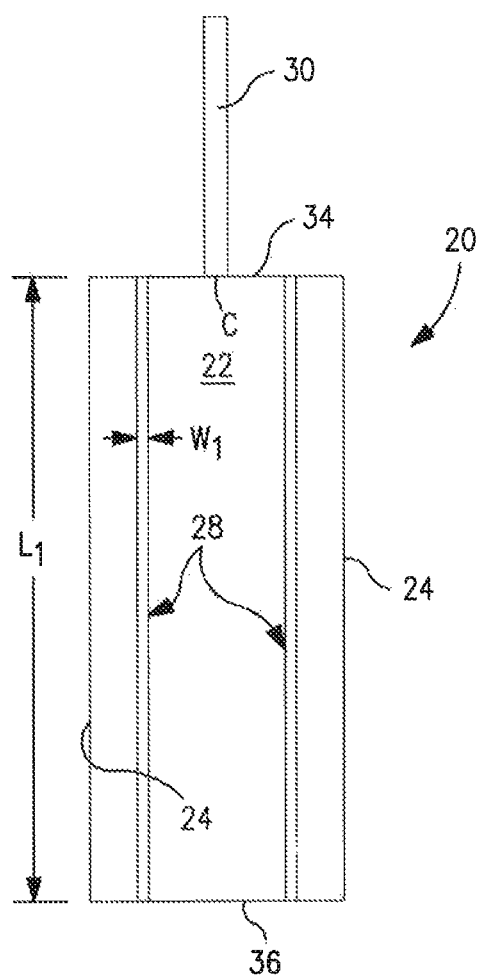
FIG. 3 is a side view of the anode of FIG. 2.
Figure 4:
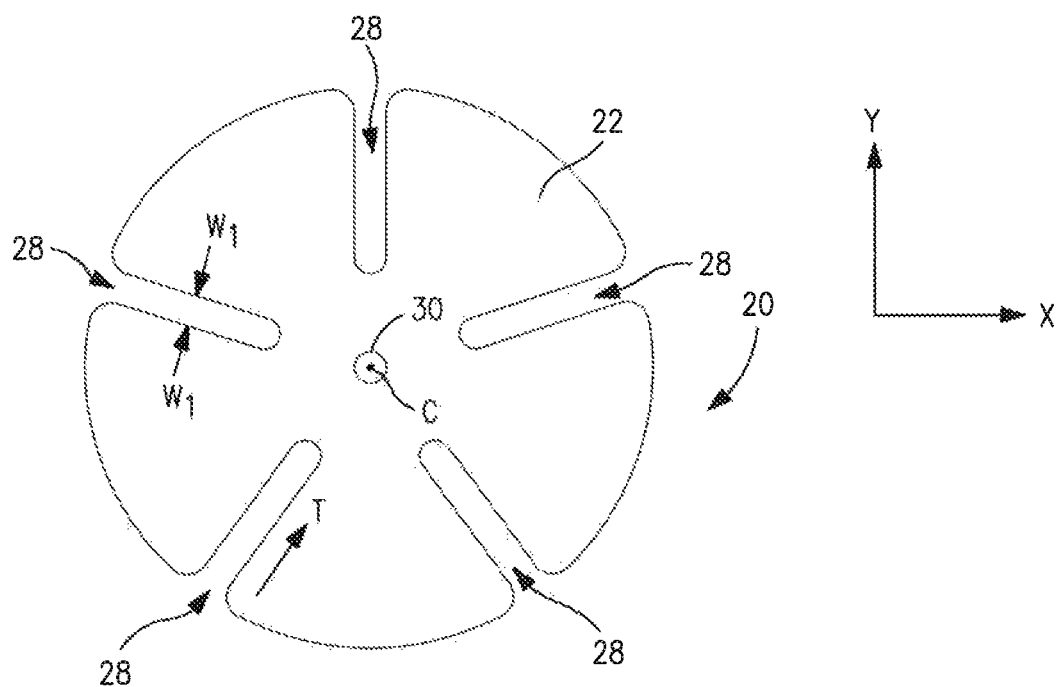
FIG. 4 is a top view of the anode of FIG. 2.

Referring to FIGS. 2-4, for example, one embodiment of an anode 20 is shown that contains a porous, sintered body 22 having at least one sidewall 24 positioned between a proximal end 34 and an opposing distal end 36. The cross-sectional shape of the proximal end 34 and/or the distal end 36 may generally vary based on the desired shape of the anode body 22. In this particular embodiment, for example, both ends 34 and 36 have a circular cross-sectional shape such that the anode body 22 is generally cylindrical. Other suitable shapes may include, for instance, square, rectangular, triangular, hexagonal, octagonal, heptagonal, pentagonal, trapezoidal, elliptical, star, sinusoidal, etc. The anode body 22 also has a length in the longitudinal direction "z" defined between the ends 34 and 36, and a width in the "x" direction and depth in the "y" direction. In the illustrated embodiment, the width and depth are both defined between the sidewalls 24. Although by no means a requirement, the length of the anode body 22 is typically greater than its width and/or depth. For example, in certain embodiments, the ratio of the length to both the width and depth may be from about 1 to about 30, in some embodiments from about 1.1 to about 10, and in some embodiments, from about 1.5 to about 5. The length of the anode 20 may, for example, range from about 0.5 to about 100 millimeters, in some embodiments from about 1 to about 60 millimeters, and in some embodiments, from about 5 to about 30 millimeters. The width of the anode body 22 may range from about 0.5 to about 50 millimeters, in some embodiments from about 1 to about 40 millimeters, and in some embodiments, from about 4 to about 30 millimeters. Likewise, the depth of the anode body 22 may range from about 0.5 to about 50 millimeters, in some embodiments from about 1 to about 40 millimeters, and in some embodiments, from about 4 to about 30 millimeters. Of course, when the anode body is cylindrical in nature, its width and depth will be the same.

In certain embodiments, at least one longitudinally extending channel is recessed into the anode body. Such channels may be formed during pressing as would be known to those skilled in the art. For example, the press mold may contain one or more longitudinal indentations that correspond to the desired shape of the channels. In this manner, the powder is compressed around the indentations so that when removed from the mold, the resulting anode body contains longitudinal channels at those areas where the longitudinal indentations were located in the mold.

Figure 5:
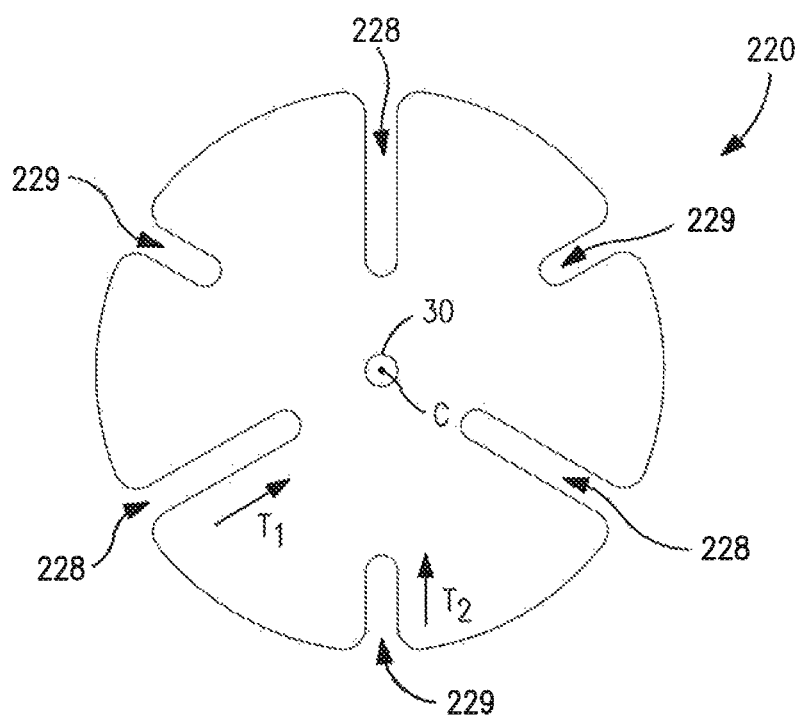
FIG. 5 is a top view of another embodiment of an anode that may be employed in the wet electrolytic capacitor of the present invention.

The channels may have a relatively high aspect ratio (length divided by width), such as about 2 or more, in some embodiments about 5 or more, in some embodiments from about 10 to about 200, in some embodiments from about 15 to about 150, in some embodiments from about 20 to about 100, and in some embodiments, from about 30 to about 60. Such channels can significantly increase the outer surface area of the anode, which may enhance the degree to which the anode can dissipate heat and Increase the likelihood that the anodizing electrolyte will pass into the pores of the anode body during anodic oxidation. Referring again to FIGS. 2-4, for instance, the anode body 22 may contain channels 28 that are recessed into the sidewall 24. The channels 28 are "longitudinally extending" in the sense that they possess a length in the longitudinal direction "z" of the anode body 22. However, while the channels 28 of FIGS. 2-4 are substantially parallel with the longitudinal direction, this is by no means a requirement. For example, other suitable embodiments may include one or more longitudinally extending channels that are in the form of a spiral, helix, etc., which are not parallel with the longitudinal of the anode body. The number of such longitudinally extending channels may vary, but is typically from 1 to 20, in some embodiments from 2 to 15, and in some embodiments, from 4 to 10. When multiple channels are employed, it is generally desired that they are distributed symmetrically and equidistant about a center longitudinal axis of the anode, although this is by no means a requirement. In FIGS. 2-4, for example, the depicted anode body 22 contains five (5) separate channels 28. FIG. 5, on the other hand, shows an alternative embodiment in which six (6) separate channels 228 are employed. In each of the particular embodiments, however, the channels are distributed in a generally symmetric manner about the longitudinal center "C" of the anode body.

At least a portion of the channels 28 may have a relatively high aspect ratio (length divided by width). The length "$L_1$" (FIG. 3) of the channels 28 may, for example, range from about 0.5 to about 100 millimeters, in some embodiments from about 1 to about 60 millimeters, and in some embodiments, from about 5 to about 30 millimeters. The width "$W_1$" of the channels 28 (FIGS. 3 and 4) may likewise range from about 0.01 to about 20 millimeters, in some embodiments from about 0.02 to about 15 millimeters, in some embodiments from about 0.05 to about 4 millimeters, and in some embodiments, from about 0.1 to about 2 millimeters. The channels 28 shown in FIGS. 2-4 extend in the longitudinal direction "L" along the entire length of the anode body 22 and intersect both the proximal end 34 and the distal end 36. It should be understood, however, that one or more channels may also extend along only a portion of the anode body length so that they intersect only one end of the anode body, or so that they do not intersect either end.

The extent to which the channels are recessed into the anode body may be selectively controlled to achieve a balance between increased surface and integrity of the anode structure. That is, if the depth of the channels is too great, it may be difficult to press the anode into a physically strong structure. Likewise, if the depth is too small, the desired benefits may not be achieved. Thus, in most embodiments, the channels are recessed so that they extend in a direction that is from about 2% to about 60%, in some embodiments from about 5% to about 50%, and in some embodiments, from about 10% to about 45% of the thickness of the anode body in the same direction. Referring again to FIG. 3, for example, one of the channels 28 is shown as extending in a direction "T." In this embodiment, the length of the channel 28 in the direction "T" divided by the thickness of the porous body 22 in the direction "T", multiplied by 100, is within the percentages referenced above.

Of course, the depth of each of the channels need not be the same. Referring to FIG. 5, for example, one embodiment of an anode 220 is shown that contains first channels 228 and second channels 229. In this particular embodiment, the first channels 228 extend into the anode body to a greater degree than the second channels 229. One of the first channels 228 may, for example, extend in a direction "$T_1$" that is from about 15% to about 60%, in some embodiments from about 20% to about 50%, and in some embodiments, from about 25% to about 45% of the thickness of the anode body in the same direction. Likewise, one of the second channels 229 may extend in a direction "$T_2$" that is from about 2% to about 40%, in some embodiments from about 5% to about 35%, and in some embodiments, from about 10% to about 25% of the anode body in the same direction. Such a configuration can effectively combine the benefits of the deeper channels (e.g., greater surface area) with those of the shallower channels (e.g., greater physical integrity). In such embodiments, the number of deeper channels may be from 1 to 10, in some embodiments from 2 to 6, and in some embodiments, from 2 to 4, and the number of shallower channels may likewise be from 1 to 10, in some embodiments from 2 to 6, and in some embodiments, from 2 to 4.

Typically, the anode also contains an anode lead wire that helps connect the anode to the terminations of the resulting capacitor. The lead wire may be formed from any electrically conductive material, such as tantalum, niobium, nickel, aluminum, hafnium, titanium, etc., as well as oxides and/or nitrides of thereof. Although not necessarily required, it is often desired that the lead wire extend in the same longitudinal direction as the channels. In the embodiment of FIGS. 2-4, for example, an anode lead wire 30 extends in the longitudinal "z" direction from the proximal end 34 of the anode body 22. Electrical contact with the anode 20 may be accomplished by in a variety of ways, such as by coupling the lead wire 30 using resistance or laser welding. Alternatively, the lead wire 30 may be embedded into the anode body during its formation (e.g., prior to sintering).

Once formed, the porous anode body is anodically oxidized ("anodized") so that a dielectric layer is formed over and/or within the anode body. For example, a tantalum (Ta) anode body may be anodized to tantalum pentoxide ($Ta_2O_5$). Anodization may be performed using electrolyte solutions such as those described above. Typically, the voltage at which anodic oxidation of the anode occurs ranges from about 4 to about 250 V, and in some embodiments, from about 9 to about 200 V, and in some embodiments, from about 20 to about 150 V.

III. Working Electrolyte

The working electrolyte is in electrical communication with the metal substrate and anode. The electrolyte is a fluid that may be impregnated within the anode, or it may be added to the capacitor at a later stage of production. The fluid electrolyte generally uniformly wets the dielectric on the anode. Various suitable electrolytes are described in U.S. Pat. Nos. 5,369,547 and 6,594,140 to Evans, et al. Typically, the electrolyte is ionically conductive in that has an electrical conductivity of from about 0.1 to about 20 Siemens per centimeter ("S/cm"), in some embodiments from about 0.2 to about 15 S/cm, and in some embodiments, from about 0.5 to about 10 S/cm, determined at a temperature of about 23° C. using any known electric conductivity meter (e.g., Oakton Con Series 11). The fluid electrolyte is generally in the form of a liquid, such as a solution (e.g., aqueous or non-aqueous), colloidal suspension, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt may be "weak" in the sense that it typically has a first acid dissociation constant ($pK_{a1}$) of about 0 to about 11, in some embodiments about 1 to about 10, and in some embodiments, from about 2 to about 10, determined at about 23° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethyformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent (s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 8.0, in some embodiments from about 5.0 to about 7.5, and in some embodiments, from about 5.5 to about 7.0. One or more pH adjusters (e.g., acids, bases, etc.) may be employed to help achieve the desired pH. In one embodiment, an acid is employed to lower the pH to the desired range. Suitable acids include, for instance, organic acids such as described above; inorganic acids, such as hydrochloric acid, nitric acid, sulfuric acid, phosphoric acid, polyphosphoric acid, boric acid, boronic acid, etc.; and mixtures thereof. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc.). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

IV. Sealing Assembly

The anode and working electrolyte of the capacitor are generally positioned within the Interior of the casing. In certain embodiments, the casing may define an opening that is closed by a sealing assembly. The sealing assembly includes, for instance, a hermetic seal that is generally formed from an insulative material, such as glass. If desired, a conductive tube may be employed that has an orifice of a size and shape sufficient to accommodate the anode lead. The conductive tube is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In such embodiments, the conductive tube may pass through a bore within the hermetic seal so that it is electrically insulated.

The arrangement of the sealing assembly within a capacitor is not critical and may vary as would be appreciated by those skilled in the art. Referring to FIG. 1, for example, one particular embodiment of a capacitor 100 is shown. As shown, the capacitor 100 contains a casing 12 having a sidewall 14 and a lower wall 16. Multiple sidewalls may be employed in such embodiments where the casing is not cylindrical. A hydrogen protection layer 17 is also applied to at least a portion of the casing 12 as discussed above. For example, the protection layer may be disposed on the Inner surfaces of the sidewall 14 and the lower wall 16. An anode 20 is also positioned within an interior 11 of the casing 12. An anode lead 30 may extend from the anode 20 in a longitudinal direction through a conductive tube 56.

The capacitor 100 also contains a sealing assembly 50. In this particular embodiment, the sealing assembly covers an opening 59 defined between crimped portions of the casing 12. Alternatively, however, a lid may be provided as is known in the art that defines the opening. In any event, a hermetic seal 54 (e.g., glass-to-metal seal) is positioned within the opening 59 in the illustrated embodiment that defines a bore through which the conductive tube 56 and the anode lead 30 can pass. The sealing assembly 50 also includes a barrier seal 70, such as a seal formed from an elastomeric material. The seal 70 may have a generally cylindrical shape and contain a bore coaxially located therein through which the conductive tube 56 and the anode lead 42 can pass. In this manner, the barrier seal 70 can cover at least a portion of the lower surface of the hermetic seal 54 to limit its contact with any electrolyte. If desired, the barrier seal 70 may cover a substantial portion of the lower surface of the hermetic seal 54. By "substantial portion", it is generally meant that the seal covers about 80% or more of the surface, in some embodiments about 90% or more of the surface, and in some embodiments, about 100% of the surface. As shown in FIG. 1, the barrier seal 70 also typically covers at least a portion of the conductive tube 56.

In addition to the sealing assembly discussed above, the capacitor of the present invention may also contain one or more secondary seals. For example, additional gaskets or bobbin may be employed that are formed from non-elastomeric insulative materials, such as polytetrafluorethylene ("PTFE"). In one embodiment, for example, a bobbin 90 may be positioned between the anode 20 and the barrier seal 70. Elastomeric rings 92 may also be employed, such as adjacent to the sidewall 14 of the casing 12. The elastomeric rings 92 may be formed from a high-temperature elastomer, such as described above, or from another type of elastomeric material. Also, if desired, a support may be provided in contact with the anode to help ensure that it remains mechanically stable during use. The support may be from an insulative material, such as polytetrafluorethylene ("PTFE"). One example of such a support is shown in FIG. 2 as element 55, which is positioned adjacent to and in contact with the lower surface of the anode 20. An external positive lead 82 may likewise be connected to the anode lead 30 at an end of the conductive tube 56 via a weld joint 80 and external negative lead 83 may be connected to the lower wall 16 of the casing 12.

Regardless of the particular configuration, the resulting capacitor of the present invention may exhibit excellent electrical properties. For example, the capacitor may exhibit a high energy density. Energy density is generally determined according to the equation $E=\frac{1}{2}*CV^2$, where C is the capacitance in farads (F) and V is the working voltage of capacitor in volts (V). The energy density may, for example, be about 2.0 joules per cubic centimeter ($J/cm^3$) or more, in some embodiments about 3.0 $J/cm^3$, in some embodiments from about 4.0 $J/cm^3$ to about 10.0 $J/cm^3$, and in some embodiments, from about 4.5 to about 8.0 $J/cm^3$. The capacitance may likewise be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$, as determined at an operating frequency of 120 Hz. The equivalent series resistance ("ESR") may also be less than about 500 milliohms, in some embodiments less than about 400 milliohms, in some embodiments less than about 300 milliohms, and in some embodiments, from about 1 to about 200 milliohms, as determined at a frequency of 120 Hz. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $\mu F*V$ is the product of the capacitance and the rated voltage.

The electrolytic capacitor of the present invention may be used in various applications, including but not limited to micro-inverters; micro-UPS devices; medical devices, such as implantable defibrillators, pacemakers, cardioverters, neural stimulators, drug administering devices, etc.; automotive applications; military applications, such as RADAR systems; consumer electronics, such as radios, televisions, etc.; and so forth.

The present invention may be better understood by reference to the following examples.

Test Procedures

Potentiostatic Measurement:

An electrical potential may be applied to an anode using Autolab/PGSTAT302N, which is a modular high power potentiostat/galvanostat with a maximum current of 2 A and compliance voltage of 30 V (potential range±10 V, potential resolution 0.3 μV, and potential accuracy±0.2%). The potentiostatic measurements are conducted at 23° C.±2° C.

EXAMPLE 1

Samples were formed by initialing sandblasting a cylindrical tantalum can for about 20 seconds. The samples were then degreased in water in an ultrasonic bath and dried at a temperature of 85° C. for 5 minutes. 1.95 grams of tantalum powder (H.C. Starck, 150,000 μF*V/g) was pressed to a 0.6 mm thick tantalum sleeve on a top/bottom press to a density of 5.7 $g/cm^3$. The binder was then vaporized at 450° C. in vacuum retort for 2 hours. The sleeve was then sintered at a temperature of 1270° C. for 10 minutes in an argon atmosphere. The resulting sleeve had a length of 18.28 mm. An anode was then formed by pressing 4.30 grams of tantalum powder (H.C. Starck, 150,000 μF*V/g) with a 0.5 mm thick tantalum lead wire on a top/bottom press machine (DORST Technologies TPA 15) to a density of 5.4 $g/cm^3$. The anode was pressed with six symmetrical, longitudinally extending channel recessed into the anode body. The binder was then removed by a washing procedure in 0.2% v/v sodium hydroxide at 85° C. and 0.05% v/v nitric acid at 85° C. The anode was sintered at a temperature of 1270° C. for 10 minutes in an argon atmosphere. The resulting anode had a size of 20.06× 7.25 mm. To pellet was then dipped into a weak phosphoric acid/water solution having a conductivity of 7900±100 mS/cm and temperature of 85° C., applied with a voltage of 10V and a current not higher than 20 mA/g, and washed with deionized water. The pressed and sintered anodes (6.3V rating) were impregnated with a 5.0 M aqueous solution of sulfuric acid (specific gravity of 1.26 $g/cm^3$). The impregnated anode was added to the tantalum sleeve cathode, which was also impregnated and filled with 5.0 M aqueous solution of sulfuric acid.

EXAMPLE 2

Capacitors were formed and tested in the manner described in Example 1, except using a different powder for the tantalum sleeve. More particularly, 2.28 grams of tantalum powder (Cabot, 18,000 μF*V/g) was pressed to a 0.6 mm thick tantalum sleeve on a top/bottom press to a density of 7.4 $g/cm^3$. The binder was then vaporized at 450° C. in vacuum retort for 2 hours. The resulting sintered sleeve had a length of 18.42 mm.

The capacitor samples of Examples 1 and 2 were thereafter were tested for electrical performance using a potentiostatic measurement. The potential was applied to the anode and generated a potential to the cathode. The potential on the cathode was measured with a multimeter. The results are set forth below.

| Time [s] | Voltage - anode [V] | Current [uA] | Voltage - cathode [V] | Cathode type |
|---|---|---|---|---|
| 1500 | 3.00 | 9.68 | −0.15 | Example 1 |
| 1800 | 3.50 | 33.58 | −0.34 | Example 1 |
| 2100 | 4.00 | 59.65 | −0.37 | Example 1 |
| 2400 | 4.50 | 123.37 | −0.40 | Example 1 |
| 1500 | 3.00 | 15.32 | −0.41 | Example 2 |
| 1800 | 3.50 | 39.39 | −0.50 | Example 2 |
| 2100 | 4.00 | 68.11 | −0.53 | Example 2 |
| 2400 | 4.50 | 89.42 | −0.54 | Example 2 |

As indicated, Example 1 showed improvement in hydrogen generation in comparison with Example 2. When the potential was applied directly to the cathode and was higher than −0.4V (i.e. −0.5V, −0.6V), hydrogen was generated; however, when the potential on the cathode was between of 0.0V to −0.4V, hydrogen was not generated.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising a casing within which is positioned an anode formed from an anodically oxidized sintered porous body and a fluidic working electrolyte, the casing containing a metal substrate over which is disposed a hydrogen protection layer that contains a plurality of sintered valve metal agglomerates formed from a valve metal composition, wherein the agglomerates have an aggregate D50 size of about 100 micrometers or less and wherein no more than about 5% of the agglomerates having a size greater than 150 micrometers.

2. The wet electrolytic capacitor of claim 1, wherein the agglomerates have an aggregate D50 size of from about 1 to about 80 micrometers.

3. The wet electrolytic capacitor of claim 1, wherein no more than about 2% of the agglomerates have a size greater than 150 micrometers.

4. The wet electrolytic capacitor of claim 1, wherein the agglomerates have an average primary particle size of from about 5 nanometers to about 20 micrometers.

5. The wet electrolytic capacitor of claim 1, wherein the agglomerates have a specific surface area of about 1.2 $m^2$/g or more.

6. The wet electrolytic capacitor of claim 1, wherein the valve metal composition includes tantalum.

7. The wet electrolytic capacitor of claim 1, wherein the metal substrate is formed from tantalum.

8. The wet electrolytic capacitor of claim 1, wherein the agglomerates are sintered to the metal substrate.

9. The wet electrolytic capacitor of claim 1, wherein the agglomerates have a specific charge of about 100,000 μF*V/g or more.

10. The wet electrolytic capacitor of claim 1, further comprising an electrochemically active material that overlies the metal substrate.

11. The wet electrolytic capacitor of claim 10, wherein the protection layer is positioned between the metal substrate and the electrochemically active material.

12. The wet electrolytic capacitor of claim 10, wherein the electrochemically active material includes a conductive polymer.

13. The wet electrolytic capacitor of claim 1, wherein the anode includes tantalum.

14. The wet electrolytic capacitor of claim 1, wherein the working electrolyte is a liquid.

15. The wet electrolytic capacitor of claim 1, wherein the working electrolyte is an aqueous solution containing sulfuric acid.

16. The wet electrolytic capacitor of claim 1, wherein a dielectric layer is present on the metal substrate.

17. The wet electrolytic capacitor of claim 1, wherein the casing defines an opening and a sidewall surrounding an interior, and wherein a sealing assembly covers the opening.

18. A method for forming the electrolytic capacitor of claim 1, the method comprising:

sintering the agglomerates to the metal substrate;

positioning an anode within an interior of the casing; and placing a fluid working electrolyte within the interior of the casing.

19. The method of claim 18, wherein the metal substrate is anodically oxidized before the agglomerates are sintered thereto.

* * * * *